(12) United States Patent
Hafvenstein et al.

(10) Patent No.: US 12,024,153 B2
(45) Date of Patent: Jul. 2, 2024

(54) SYSTEM AND METHOD FOR CONTROLLING BOOM ASSEMBLY MOVEMENT OF AN AGRICULTURAL SPRAYER

(71) Applicant: CNH Industrial America LLC, New Holland, PA (US)

(72) Inventors: David Hafvenstein, Benson, MN (US); Jose Batz-Alvarado, Lyons, IL (US); Nathan Paul Brooks, Manitowoc, WI (US); Jeremy A. Amundson, Willmar, MN (US)

(73) Assignee: CNH Industrial America LLC, New Holland, PA (US)

( * ) Notice: Subject to any disclaimer, the term of this patent is extended or adjusted under 35 U.S.C. 154(b) by 483 days.

(21) Appl. No.: 17/307,206

(22) Filed: May 4, 2021

(65) Prior Publication Data
US 2022/0264863 A1     Aug. 25, 2022

Related U.S. Application Data

(60) Provisional application No. 63/151,921, filed on Feb. 22, 2021.

(51) Int. Cl.
*A01M 7/00*    (2006.01)
*A01C 23/00*    (2006.01)
(Continued)

(52) U.S. Cl.
CPC ......... *B60W 10/103* (2013.01); *A01C 23/007* (2013.01); *A01C 23/008* (2013.01);
(Continued)

(58) Field of Classification Search
CPC .................. A01M 7/0057; A01M 7/0089
See application file for complete search history.

(56) References Cited

U.S. PATENT DOCUMENTS

| | | | |
|---|---|---|---|
| 5,348,226 A * | 9/1994 | Heiniger | A01M 7/0057 239/164 |
| 5,988,528 A | 11/1999 | Krohn et al. | |

(Continued)

FOREIGN PATENT DOCUMENTS

| | | |
|---|---|---|
| CA | 2757092 A1 | 10/2012 |
| CN | 212116814 U | 12/2020 |
| EP | 1444894 B1 | 8/2004 |

*Primary Examiner* — Joseph A Greenlund
(74) *Attorney, Agent, or Firm* — Rebecca L. Henkel; Peter K. Zacharias; Rickard K. DeMille

(57) ABSTRACT

An agricultural sprayer includes an actuator configured to adjust the position of a boom assembly of the sprayer relative to a frame of the sprayer. A computing system is configured to determine the operating parameter of the sprayer at a current time based on received sensor data. Moreover, the computing system is configured to anticipate when the boom assembly will move relative to the frame in a fore/aft direction at a future time based on the determined operating parameter, with the fore/aft direction being parallel to a direction of travel of the agricultural sprayer. In addition, when it is anticipated that the boom assembly will move, the computing system is configured to control the operation of the actuator before the future time such that movement of the boom assembly relative to the frame is reduced at the future time.

18 Claims, 4 Drawing Sheets

(51) Int. Cl.

| | | |
|---|---|---|
| *A01C 23/04* | (2006.01) | |
| *A01D 41/127* | (2006.01) | |
| *A01D 69/00* | (2006.01) | |
| *B05B 1/20* | (2006.01) | |
| *B05B 12/02* | (2006.01) | |
| *B05B 12/08* | (2006.01) | |
| *B05B 12/14* | (2006.01) | |
| *B05B 12/16* | (2018.01) | |
| *B05B 15/55* | (2018.01) | |
| *B05B 15/65* | (2018.01) | |
| *B08B 3/02* | (2006.01) | |
| *B08B 5/02* | (2006.01) | |
| *B60W 10/06* | (2006.01) | |
| *B60W 10/103* | (2012.01) | |
| *B60W 10/18* | (2012.01) | |
| *B60W 30/18* | (2012.01) | |
| *B60W 40/076* | (2012.01) | |
| *B67D 7/02* | (2010.01) | |
| *B67D 7/36* | (2010.01) | |
| *B67D 7/38* | (2010.01) | |
| *B67D 7/78* | (2010.01) | |
| *B67D 99/00* | (2010.01) | |
| *E02F 3/46* | (2006.01) | |
| *E02F 9/22* | (2006.01) | |
| *F16L 3/22* | (2006.01) | |
| *G01M 3/32* | (2006.01) | |
| *G05D 1/00* | (2006.01) | |
| *G05D 1/223* | (2024.01) | |
| *G07C 5/00* | (2006.01) | |
| *G07C 5/08* | (2006.01) | |
| *B05B 14/00* | (2018.01) | |
| *G01F 23/70* | (2006.01) | |

(52) U.S. Cl.
CPC ........ *A01C 23/047* (2013.01); *A01D 41/1274* (2013.01); *A01D 69/00* (2013.01); *A01M 7/0042* (2013.01); *A01M 7/0057* (2013.01); *A01M 7/0085* (2013.01); *A01M 7/0089* (2013.01); *B05B 1/20* (2013.01); *B05B 12/02* (2013.01); *B05B 12/081* (2013.01); *B05B 12/085* (2013.01); *B05B 12/14* (2013.01); *B05B 12/16* (2018.02); *B05B 15/55* (2018.02); *B05B 15/65* (2018.02); *B08B 3/02* (2013.01); *B08B 5/02* (2013.01); *B60W 10/06* (2013.01); *B60W 10/18* (2013.01); *B60W 10/182* (2013.01); *B60W 30/18118* (2013.01); *B60W 40/076* (2013.01); *B67D 7/02* (2013.01); *B67D 7/0294* (2013.01); *B67D 7/36* (2013.01); *B67D 7/362* (2013.01); *B67D 7/38* (2013.01); *B67D 7/78* (2013.01); *B67D 99/00* (2013.01); *E02F 3/46* (2013.01); *E02F 9/2271* (2013.01); *E02F 9/2275* (2013.01); *F16L 3/221* (2013.01); *G01M 3/3245* (2013.01); *G05D 1/0016* (2013.01); *G05D 1/223* (2024.01); *G07C 5/008* (2013.01); *G07C 5/08* (2013.01); *A01M 7/0082* (2013.01); *B05B 14/00* (2018.02); *B08B 2203/0205* (2013.01); *B60W 2520/10* (2013.01); *B60W 2552/15* (2020.02); *B60W 2720/10* (2013.01); *G01F 23/70* (2013.01)

(56) References Cited

U.S. PATENT DOCUMENTS

| | | | | |
|---|---|---|---|---|
| 8,942,893 | B2 | 1/2015 | Rosa et al. | |
| 10,255,670 | B1* | 4/2019 | Wu | H04N 7/183 |
| 10,420,276 | B2 | 9/2019 | Otto et al. | |
| 11,213,846 | B1* | 1/2022 | Sandey | A01M 7/0042 |
| 11,647,685 | B2* | 5/2023 | Weidenbach | A01B 63/24 |
| | | | | 701/50 |
| 11,723,354 | B2* | 8/2023 | Long | A01M 7/006 |
| | | | | 700/283 |
| 2011/0153168 | A1* | 6/2011 | Peterson | A01B 79/005 |
| | | | | 701/50 |
| 2014/0074360 | A1* | 3/2014 | Rosa | G05D 3/12 |
| | | | | 701/50 |
| 2016/0136671 | A1* | 5/2016 | Kocer | A01C 23/007 |
| | | | | 700/283 |
| 2016/0368011 | A1* | 12/2016 | Feldhaus | B05B 12/124 |
| 2018/0054983 | A1* | 3/2018 | Hanna | G05B 19/042 |
| 2018/0220638 | A1* | 8/2018 | Gresch | A01M 7/0057 |
| 2018/0271015 | A1* | 9/2018 | Redden | G06N 3/08 |
| 2019/0135171 | A1* | 5/2019 | Brooks | B60Q 3/74 |
| 2019/0150357 | A1* | 5/2019 | Wu | H04N 7/188 |
| 2019/0152360 | A1* | 5/2019 | Brooks | B60N 2/1665 |
| 2019/0176559 | A1* | 6/2019 | Bittner | B60G 7/001 |
| 2019/0357520 | A1* | 11/2019 | Redden | G05B 17/02 |
| 2020/0239063 | A1* | 7/2020 | Brooks | B62D 5/006 |
| 2021/0078853 | A1* | 3/2021 | Long | B67D 7/145 |
| 2021/0127567 | A1* | 5/2021 | Loukili | B05B 12/082 |
| 2021/0153419 | A1* | 5/2021 | Winkel | A01B 73/067 |
| 2021/0172444 | A1* | 6/2021 | Ruppert | A01C 23/007 |
| 2021/0204469 | A1* | 7/2021 | Tollefsrud | A01C 15/006 |
| 2021/0274772 | A1* | 9/2021 | Long | B05B 12/08 |
| 2022/0124962 | A1* | 4/2022 | Long | G05D 1/0223 |
| 2022/0125033 | A1* | 4/2022 | Long | B05B 12/085 |
| 2022/0167543 | A1* | 6/2022 | Bast | G05D 1/0223 |
| 2022/0264861 | A1* | 8/2022 | Bast | A01M 7/0089 |
| 2022/0268300 | A1* | 8/2022 | Hafvenstein | B67D 7/02 |

* cited by examiner

SYSTEM AND METHOD FOR CONTROLLING BOOM ASSEMBLY MOVEMENT OF AN AGRICULTURAL SPRAYER

CROSS-REFERENCE TO RELATED APPLICATIONS

This application is based upon and claims the right of priority to U.S. Provisional Patent Application No. 63/151,921, filed on Feb. 22, 2021, the disclosure of which is hereby incorporated by reference herein in its entirety for all purposes.

FIELD OF THE INVENTION

The present disclosure generally relates to agricultural sprayers and, more particularly, to systems and methods for controlling the movement of a boom assembly of an agricultural sprayer.

BACKGROUND OF THE INVENTION

Agricultural sprayers apply an agricultural fluid (e.g., a pesticide, a nutrient, and/or the like) onto crops as the sprayer is traveling across a field. To facilitate such travel, sprayers are configured as self-propelled vehicles or implements towed behind an agricultural tractor or other suitable work vehicle. A typical sprayer includes a boom assembly on which a plurality of spaced apart nozzles is mounted. Each nozzle is configured to dispense or otherwise spray the agricultural fluid onto underlying crops and/or field surface.

It is generally desirable that the agricultural fluid be deposited on the underlying crop canopy or field surface at an even target rate to achieve a specified agricultural outcome (e.g., a reduction in weed coverage or pest activity). However, as the sprayer travels across the field to perform a spraying operation, the boom assembly may move relative to the frame of the sprayer on which it is mounted. For example, the wind, acceleration/deceleration of the sprayer, hills, and/or the like may cause the boom assembly to move relative to the frame in the fore/aft direction. This movement of the boom assembly may, in turn, result in uneven deposition of the agricultural fluid on the underlying field, which is known as "tiger-striping." Such uneven deposition of the agricultural fluid may result in portions of the field receiving too much agricultural fluid and other portions of the field receiving too little agricultural fluid, thereby reducing the effectiveness of the spraying operation.

Accordingly, an improved system and method for controlling boom assembly movement of an agricultural sprayer would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural sprayer. The agricultural sprayer includes a frame and a tank supported on the frame, with the tank configured to store an agricultural fluid. Furthermore, the agricultural sprayer includes a boom assembly coupled to the frame and a plurality of nozzles supported on the boom assembly, with the plurality of nozzles configured to dispense the agricultural fluid stored within the tank onto an underlying field. Additionally, the agricultural sprayer includes an actuator configured to adjust a position of the boom assembly relative to the frame, a sensor configured to capture data indicative of an operating parameter of the agricultural sprayer, and a computing system communicatively coupled to the sensor. In this respect, the computing system is configured to determine the operating parameter at a current time based on the data captured by the sensor. Moreover, the computing system is configured to anticipate when the boom assembly will move relative to the frame in a fore/aft direction at a future time based on the determined operating parameter, with the fore/aft direction being parallel to a direction of travel of the agricultural sprayer. In addition, when it is anticipated that the boom assembly will move, the computing system is configured to control an operation of the actuator before the future time such that movement of the boom assembly relative to the frame is reduced at the future time.

In another aspect, the present subject matter is directed to a system for controlling boom assembly movement of an agricultural sprayer. The system includes a sprayer frame, a boom assembly coupled to the sprayer frame, and an actuator configured to adjust a position of the boom assembly relative to the sprayer frame. Furthermore, the system includes a sensor configured to capture data indicative of an operating parameter of the agricultural sprayer and a computing system communicatively coupled to the sensor. In this respect, the computing system is configured to determine the operating parameter at a current time based on the data captured by the sensor. Additionally, the computing system is configured to anticipate when the boom assembly will move relative to the sprayer frame in a fore/aft direction at a future time based on the determined operating parameter, with the fore/aft direction being parallel to a direction of travel of the agricultural sprayer, Moreover, when it is anticipated that the boom assembly will move, the computing system is configured to control an operation of the actuator before the future time such that movement of the boom assembly relative to the sprayer frame is reduced at the future time.

In a further aspect, the present subject matter is directed to a method for controlling boom assembly movement of an agricultural sprayer. The agricultural sprayer, in turn, includes a frame, a boom assembly coupled to the frame, and an actuator configured to adjust a position of the boom assembly relative to the frame. The method includes receiving, with a computing system, sensor data indicative of an operating parameter of the agricultural sprayer. Furthermore, the method includes determining, with the computing system, the operating parameter at a current time based on the received sensor data. Additionally, the method includes anticipating, with the computing system, when the boom assembly will move relative to the frame in a fore/aft direction at a future time based on the determined operating parameter, with the fore/aft direction being parallel to a direction of travel of the agricultural sprayer. Moreover, when it is anticipated that the boom assembly will move, the method includes controlling, with the computing system, an operation of the actuator before the future time such that movement of the boom assembly relative to the frame is reduced at the future time.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
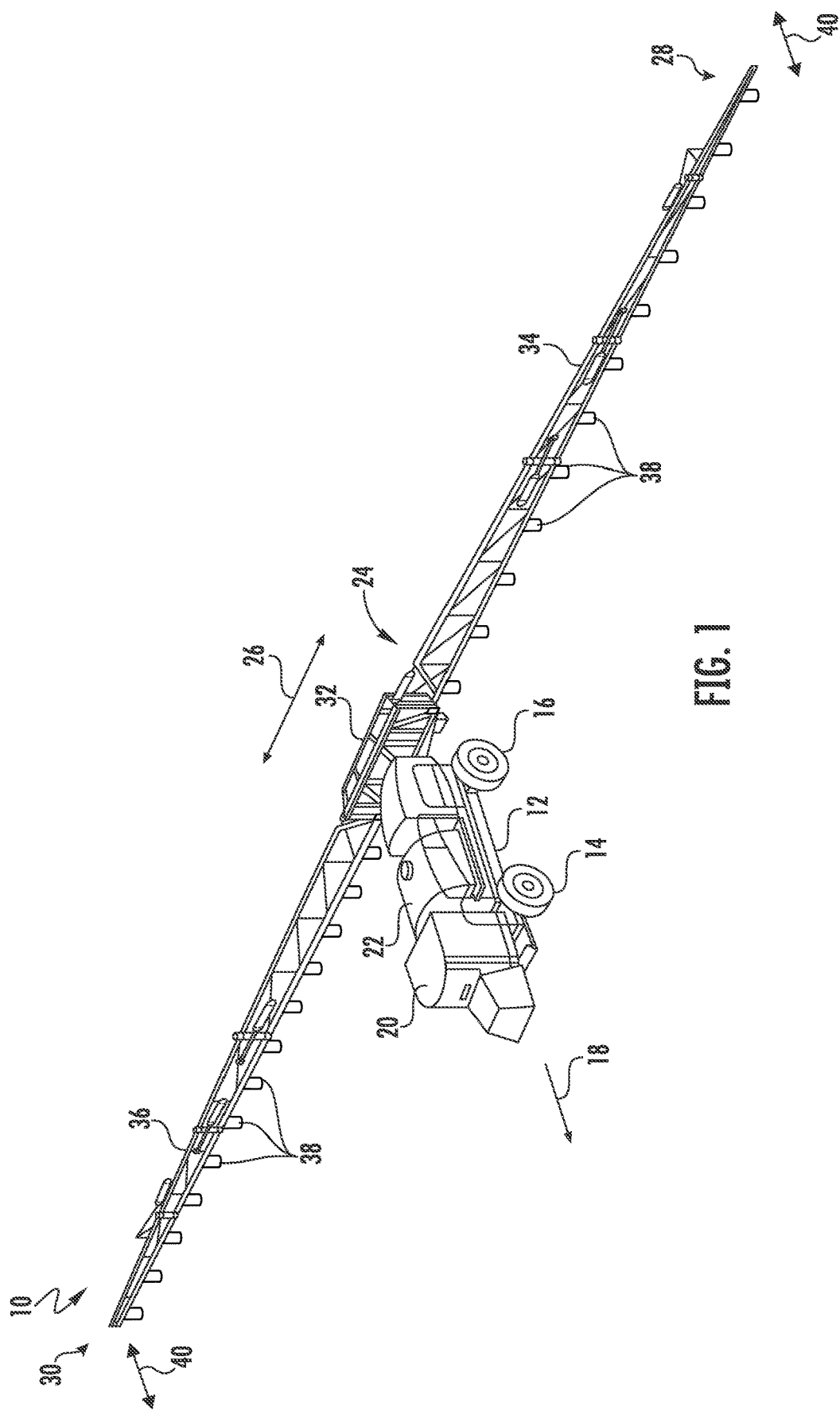
FIG. 1 illustrates a perspective view of one embodiment of an agricultural sprayer in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to system and methods for controlling boom assembly movement of an agricultural sprayer. As will be described below, the agricultural sprayer may include a frame, a boom assembly coupled to the frame, and a plurality of nozzles supported on the boom assembly. Each nozzle may, in turn, be configured to dispense an agricultural fluid (e.g., a pesticide) onto the underlying field. Additionally, the agricultural sprayer may include one or more actuators (e.g., a fluid-driven actuator(s)) configured to adjust a position of the boom assembly relative to the frame.

In several embodiments, a computing system may be configured to control the operation of the actuator(s) of the sprayer when it is anticipated that movement of the boom assembly will occur. More specifically, the computing system may determine one or more operating parameter(s) at a current time based on the received sensor data. For example, such operating parameter(s) may be associated with acceleration of the sprayer, the topography of the field in front of the sprayer, and/or the like. Furthermore, the computing system may anticipate when the boom assembly will move relative to the frame in a fore/aft direction at a future time based on the operating parameter(s) determined at the current time. Thereafter, when it is anticipated that the boom assembly will move, the computing system may control the operation of the actuator(s) before the future time such that movement of the boom assembly relative to the frame is reduced or minimized at the future time.

Anticipating when the boom assembly will move relative to the frame in the fore/aft direction improves the operation of the sprayer and the effectiveness of the associated spraying operation. More specifically, conventional systems and methods generally wait for movement of the boom assembly to occur and then control the actuator(s) to reduce this movement. Such a control methodology may result in uneven deposition of the agricultural fluid (e.g., tiger-striping) on portions of the field that the sprayer traverses between when boom assembly is moving. However, by anticipating when the boom assembly will move at a future time and adjusting the operation of the actuator(s) prior to that time, the movement of the boom assembly can be reduced or even eliminated. Such preemptive control may allow for more even deposition of the agricultural fluid across portions of the field where boom movement would otherwise occur, thereby improving the effectiveness of the spraying operation.

Referring now to the drawings, FIG. 1 illustrates a perspective view of one embodiment of an agricultural sprayer 10. In the illustrated embodiment, the agricultural sprayer 10 is configured as a self-propelled agricultural sprayer. However, in alternative embodiments, the agricultural sprayer 10 may be configured as any other suitable agricultural vehicle that dispenses an agricultural fluid (e.g., a pesticide or a nutrient) while traveling across a field, such as an agricultural tractor and an associated implement (e.g., a towable sprayer, an inter-seeder, a side-dresser, and/or the like).

As shown in FIG. 1, the agricultural sprayer 10 includes a frame or chassis 12 configured to support or couple to a plurality of components. For example, a pair of steerable front wheels 14 and a pair of driven rear wheels 16 may be coupled to the frame 12. The wheels 14, 16 may be configured to support the agricultural sprayer 10 relative to the ground and move the sprayer 10 in a direction of travel (indicated by arrow 18) across the field. Furthermore, the frame 12 may support a cab 20 and an agricultural fluid tank 22 configured to store or hold an agricultural fluid, such as a pesticide (e.g., a herbicide, an insecticide, a rodenticide, and/or the like), a fertilizer, or a nutrient. However, in alternative embodiments, the sprayer 10 may have any other suitable configuration. For example, in one embodiment, the front wheels 14 of the sprayer 10 may be driven in addition to or in lieu of the rear wheels 16.

Additionally, the sprayer 10 may include a boom assembly 24 mounted on the frame 12. In general, the boom assembly 24 may extend in a lateral direction (indicated by arrow 26) between a first lateral end 28 and a second lateral end 30, with the lateral direction 26 being perpendicular to the direction of travel 18. In one embodiment, the boom assembly 24 may include a center section 32 and a pair of wing sections 34, 36. As shown in FIG. 1, a first wing section 34 extends outwardly in the lateral direction 26 from the center section 32 to the first lateral end 28. Similarly, a second wing section 36 extends outwardly in the lateral direction 26 from the center section 32 to the second lateral end 30. Furthermore, a plurality of nozzles 38 may be supported on the boom assembly 24. Each nozzle 38 may, in turn, be configured to dispense the agricultural fluid stored in the tank 22 onto the underlying field. However, in alternative embodiments, the boom assembly 24 may have any other suitable configuration.

During operation of the agricultural sprayer 10, the boom assembly 24 may move relative to the frame 12 in a fore/aft direction (indicated by arrows 40). The fore/aft direction 40, in turn, extends parallel to the direction of travel 18 of the sprayer 10. Thus, movement of the boom assembly 24 relative to the frame 12 in the fore/aft direction 40 may generally occur within a plane that is parallel of the surface of the field across which the sprayer 10 is traveling. For example, fore/aft movement of the boom assembly 24 may be caused by the acceleration/deceleration of the sprayer 10, changes in field topography, and/or the like. Such fore/aft movement may result in uneven deposition of the agricultural fluid on the underlying field or tiger-striping. In this respect, as will be described below, fore/aft movement of the boom assembly 24 may be anticipated and preemptive adjustments to the boom assembly 24 may be made to reduce or eliminate such movement, thereby improving the evenness of the agricultural fluid deposition across the field.

It should be further appreciated that the configuration of the agricultural sprayer 10 described above and shown in FIG. 1 is provided only to place the present subject matter in an exemplary field of use. Thus, it should be appreciated that the present subject matter may be readily adaptable to any manner of agricultural sprayer configuration.

Figure 2:
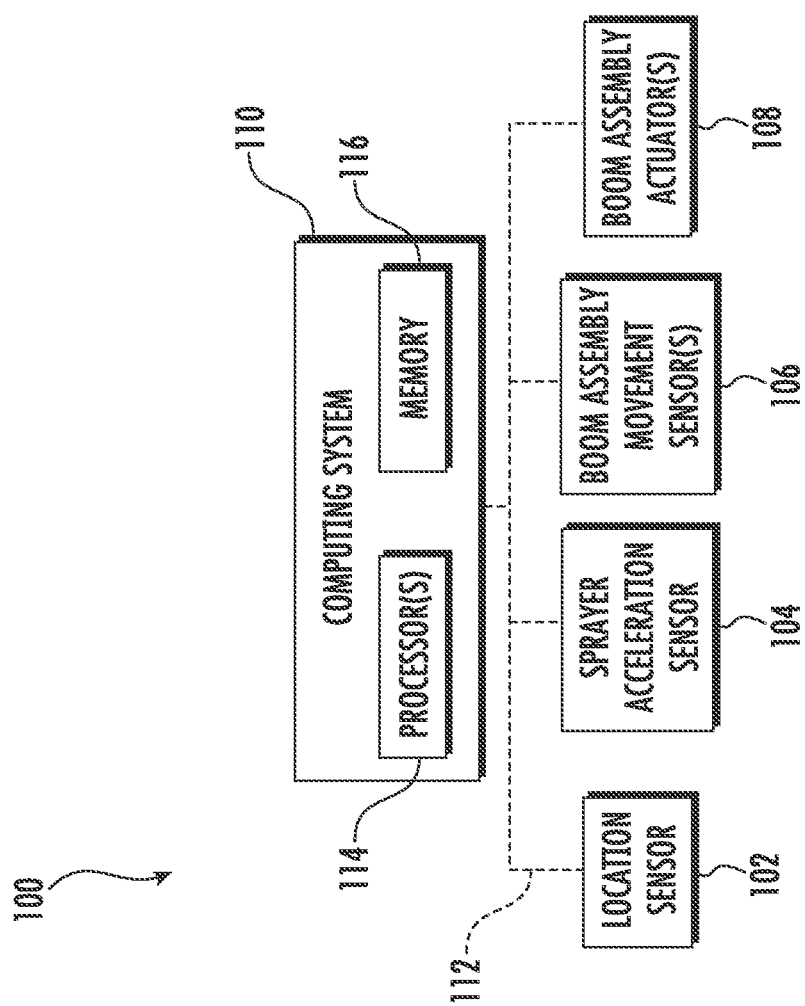
FIG. 2 illustrates a schematic view of one embodiment of a system for controlling boom assembly movement of an agricultural sprayer in accordance with aspects of the present subject matter.

Referring now to FIG. 2, a schematic view of one embodiment of a system 100 for controlling boom assembly movement of an agricultural sprayer is illustrated in accordance with aspects of the present subject matter. In general, the system 100 will be described herein with reference to the agricultural sprayer 10 described above with reference to the FIG. 1. However, it should be appreciated by those of ordinary skill in the art that the disclosed system 100 may generally be utilized with agricultural sprayers having any other suitable sprayer configuration.

As shown in FIG. 2, the system 100 includes one or more sensors configured capture data indicative of an operating parameter(s) of the agricultural sprayer 10. For example, in several embodiments, the system 100 may include a location sensor 102 provided in operative association with the sprayer 10. In general, the location sensor 102 may be configured to determine the current location of the sprayer 10 using a satellite navigation positioning system (e.g., a GPS system, a Galileo positioning system, the Global Navigation satellite system (GLONASS), the BeiDou Satellite Navigation and Positioning system, and/or the like). In such an embodiment, the location determined by the location sensor 102 may be transmitted to a computing system of the sprayer 10 (e.g., in the form coordinates) and stored within the computing system's memory for subsequent processing and/or analysis. As will be described below, the determined location from the location sensor 102 and a field map may be used to determine the topography of the field in front of the sprayer 10 relative to the direction of travel 18. The determined field topography in front of the sprayer 10 may, in turn, be used to anticipate movement of the boom assembly 24 relative to the frame 12 in the fore/aft direction 40.

Moreover, in several embodiments, the system 100 may include a sprayer acceleration sensor 104. In general, the sprayer acceleration sensor 104 may be configured to capture data associated with the acceleration of the sprayer 10 relative to the surface of the field across with the sprayer 10 is traveling. For example, in one embodiment, the sprayer acceleration sensor 104 may correspond to a throttle position sensor configured to capture data indicative of the position of the throttle of the sprayer 10 (or associated input, such a pedal or lever). Based on the captured throttle position data, the subsequent acceleration or deceleration caused based such throttle position can be estimated or determined. Such acceleration/deceleration may, in turn, be used to anticipated movement of the boom assembly 24 relative to the frame 12 in the fore/aft direction 40.

Furthermore, in several embodiments, the system 100 may include one or more boom assembly movement sensors 106. In general, the boom assembly movement sensor(s) 106 may be configured to capture data indicative of movement of the boom assembly 24 of the sprayer 10 relative to the frame 12 and/or the surface of the field. For example, the boom movement sensor(s) 106 may capture data indicative of the pitch, roll, and/or yaw of the boom assembly 24, the angle of the boom assembly 24 (or portions thereof) relative to the frame 12, and/or the like. In this respect, the boom assembly movement sensor(s) 108 may correspond to any suitable sensor(s) or sensing devices(s) configured to capture data indicative of movement of the boom assembly 24, such as a potentiometer(s), an accelerometer(s), an inertial measurement unit(s) (IMU(s)), and/or the like. As will be described below, the boom assembly movement data may be used in combination with other operating parameter data (e.g., the topography in front of the sprayer and/or the estimated acceleration of the sprayer 10) to estimate the magnitude of any anticipated boom assembly movement.

Additionally, the system 100 may include one or more boom assembly actuators 108 of the sprayer 10. More specifically, the boom assembly actuator(s) 108 may be configured to adjust the position of the boom assembly 24 relative the frame 12 and/or the position of a section(s) of the boom assembly 24 (e.g., the wing sections 34, 36) relative to another section(s) of the boom assembly 24 (e.g., the center section 32). For example, in one embodiment, the boom assembly actuator(s) 108 may be configured to adjust the positions of the wing sections 34, 36 relative to the frame 12 such that the angles defined between the wing sections 34, 36 and the longitudinal centerline of the sprayer 10 (which is parallel to the direction of travel 18) are adjusted. However, in alternative embodiments, the boom assembly actuator(s) 108 may be configured to adjust the position of the boom assembly 24 (or a portion thereof) in any other suitable manner.

The system 100 may include any suitable number of boom assembly actuators 108 and the boom assembly actuator(s) 108 may correspond to any suitable type of actuator(s). For example, in some embodiments, the boom assembly actuator(s) 108 may correspond to a fluid-driven actuator(s), such as a hydraulic cylinder(s) or a pneumatic cylinder(s). However, in alternative embodiments, the boom assembly actuator(s) 108 may correspond to any suitable type of actuator(s), such as an electric linear actuator(s).

In addition, the system 100 may include a computing system 110 communicatively coupled to one or more components of the agricultural sprayer 10 and/or the system 100 to allow the operation of such components to be electronically or automatically controlled by the computing system 110. For instance, the computing system 110 may be communicatively coupled to the sensors 102, 104, 106 of the system 100 via a communicative link 112. As such, the computing system 110 may be configured to receive data from the sensors 102, 104, 106 that is indicative of various operating parameters of the sprayer 10. Moreover, the computing system 110 may be communicatively coupled to the boom assembly actuator(s) 108 of the sprayer 10 via the communicative link 112. In this respect, the computing system 110 may be configured to control the operation of the boom assembly actuator(s) 108 to reduce or eliminate anticipated movement of the boom assembly 24 relative to the frame 12 in the fore/aft direction 40. Additionally, the computing system 110 may be communicatively coupled to any other suitable components of the sprayer 10 and/or the system 100.

In general, the computing system 110 may comprise one or more processor-based devices, such as a given controller or computing device or any suitable combination of controllers or computing devices. Thus, in several embodiments, the computing system 110 may include one or more processor(s) 114 and associated memory device(s) 116 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 116 of the computing system 110 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 116 may generally be configured to store suitable computer-readable instructions that, when implemented by the processor(s) 114, configure the computing system 110 to perform various computer-implemented functions, such as one or more aspects of the methods and algorithms that will be described herein. In addition, the computing system 110 may also include various other suitable components, such as a communications circuit or module, one or more input/output channels, a data/control bus and/or the like.

The various functions of the computing system 110 may be performed by a single processor-based device or may be distributed across any number of processor-based devices, in which instance such devices may be considered to form part of the computing system 110. For instance, the functions of the computing system 110 may be distributed across multiple application-specific controllers or computing devices, such as a navigation controller, an engine controller, a transmission controller, a spray controller, and/or the like.

Figure 3:
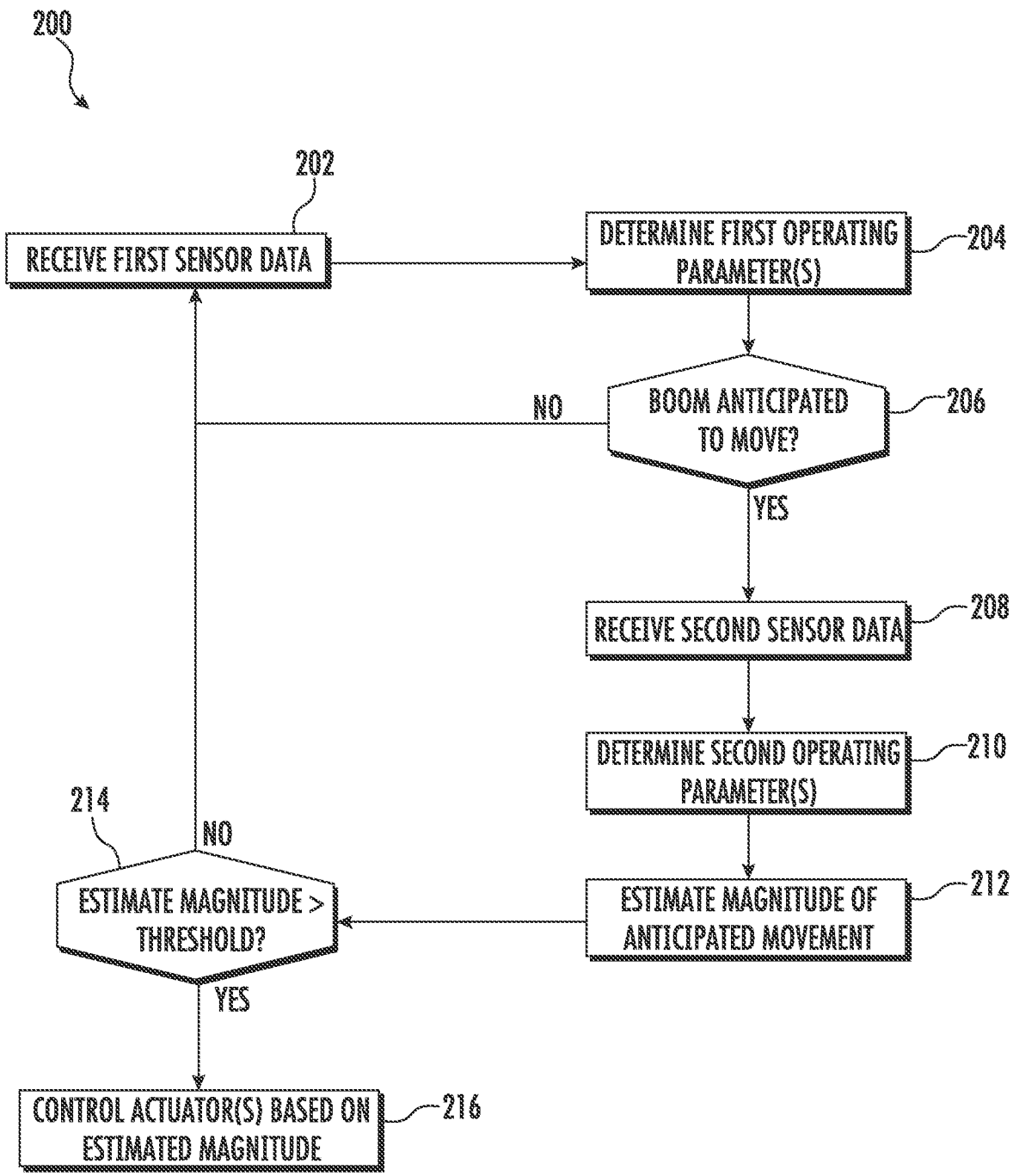
FIG. 3 illustrates a flow diagram providing one embodiment of example control logic for controlling boom assembly movement of an agricultural sprayer in accordance with aspects of the present subject matter.

Referring now to FIG. 3, a flow diagram of one embodiment of example control logic 200 that may be executed by the computing system 110 (or any other suitable computing system) for controlling boom assembly movement of an agricultural sprayer is illustrated in accordance with aspects of the present subject matter. Specifically, the control logic 200 shown in FIG. 3 is representative of steps of one embodiment of an algorithm that can be executed to control boom assembly movement of an agricultural sprayer in a manner that reduces or eliminates anticipated boom assembly movement relative to the frame in the fore/aft direction. Thus, in several embodiments, the control logic 200 may be advantageously utilized in association with a system installed on or forming part of an agricultural sprayer to allow for real-time control of boom assembly movement without requiring substantial computing resources and/or processing time. However, in other embodiments, the control logic 200 may be used in association with any other suitable system, application, and/or the like for controlling boom assembly movement of an agricultural sprayer.

As shown in FIG. 3, at (202), the control logic 200 includes receiving first sensor data. In general, the first sensor data may be indicative of one or more first operating parameters of the agricultural sprayer 10 that are used to anticipate when movement of the boom assembly 24 relative to the frame 12 in the fore/aft direction 40 will occur. As will be described below, the received first sensor data may be used with other sensor data to estimate the magnitude of the anticipated boom assembly movement. In several embodiments, as mentioned above, the computing system 110 may be communicatively coupled to the location sensor 102 and the sprayer acceleration sensor 104 via the communicative link 112. In this respect, during operation of the sprayer 10, the computing system 110 may receive data from the location sensor 102 that is indicative position of the sprayer 10 within the field. In addition, during operation of the sprayer 10, the computing system 110 may receive data from the sprayer acceleration sensor 104 that is indicative of the acceleration (or expected acceleration) of the sprayer 10.

Furthermore, at (204), the control logic 200 includes determining one or more first operating parameters based on the received first sensor data. As indicated above, the first operating parameter(s) may be determined at the current time and used to anticipate when movement of the boom assembly 24 relative to the frame 12 in the fore/aft direction 40 will occur at a future time. For example, the computing system 110 may include a look-up table(s), suitable mathematical formula, and/or algorithms stored within its memory device(s) 116 that correlates the received first sensor data to the first operating parameter(s).

In several embodiments, at (204), the computing system 110 may be configured to determine one or more topographical features present within and/or topographical parameters associated with a portion of the field in front of the sprayer 10 relative to the direction of the travel 18. Specifically, in such embodiments, when the sprayer 10 is traveling across the field to perform a spraying operation, the computing system 110 may access a field map having the topographical data associated with the field from its memory device(s) 116 or a remove device (not shown), such as a remote server database. In this respect, the computing system 110 may use the coordinates received from the location sensor 102 (e.g., at (202)) to determine any topographical features present in front of the sprayer 10 (and any suitable parameters associated with these features) based on the accessed field map. As will be described below, the identified topographical features/parameters may be used to anticipate when movement of the boom assembly 24 relative to the frame 12 in the fore/aft direction 40 will occur.

At (204), the computing system 110 may determine any suitable topographical features and/or parameters associated with the portion of the field in front of the sprayer 10. For example, in some embodiments, the computing system 110 may determine the presence of hills or other slopes and the inclination of such hills/slopes.

Additionally, in several embodiments, at (204), the computing system 110 may be configured to determine an operating parameter is associated with an acceleration of the agricultural sprayer relative to the field. Specifically, as mentioned above, when the sprayer 10 is traveling across the field to perform the spraying operation, the computing system 110 may receive sensor data indicative of the acceleration (or expected acceleration) of the sprayer 10 relative to the ground. For example, in one embodiment, the received sensor data indicative of acceleration corresponds to throttle position sensor. In such an embodiment, the computing system 110 may determine the position of the throttle (or the associated accelerator pedal/lever) based on the received throttle position sensor data. Thereafter, the computing system 110 may estimate the subsequent acceleration caused based such throttle position. As will be described below, the estimated acceleration may be used to anticipate when movement of the boom assembly 24 relative to the frame 12 in the fore/aft direction 40 will occur. In addition, the estimated deceleration of the sprayer (e.g., when the brakes are applied) may also be determined (e.g., based on brake pedal position sensor data) at (204).

Additionally, or alternatively, at (202) and (204), the computing system 110 may receive any other suitable first sensor data and determine any other suitable first operating parameters, respectively, that may be used to anticipate when the boom assembly 24 will move relative to the frame 12 in the fore/aft direction 40.

As shown in FIG. 3, at (206), the control logic 200 includes anticipating when the boom assembly of the sprayer will move relative to a frame of the sprayer in a fore/aft direction. As described above, in certain instances, the boom assembly 24 may move relative to the frame 12 in the fore/aft direction 40. Such movement may, in turn, result in uneven deposition of the agricultural fluid across the field. In this respect, the computing system 110 may use the determined first operating parameter(s) (e.g., the operating parameter(s) determined at (204)) to anticipate when the boom assembly 24 will move relative to the frame 12 in the fore/aft direction 40 at a future time. By anticipating when the boom assembly 24 will move at a future time, the computing system 110 may control the operation of the boom assembly actuator(s) 108 before the future time to reduce or eliminate the boom assembly movement at the future time. Such preemptive control of the boom assembly actuator(s) 108 may, in turn, improve the evenness of the agricultural fluid deposition across the field, thereby increasing the effectiveness of the spraying operation. As such, when it is anticipated that the boom assembly 204 will move, the control logic 200 proceeds to (208). Conversely, when no boom assembly movement is anticipated, the computing system 110 continues to receive the first sensor data (e.g., at (202)) and determine the first operating parameter(s) (e.g., at (204)).

In several embodiments, at (206), the computing system 110 may anticipate when the boom assembly 24 will move relative to the frame 12 in the fore/aft direction 40 at a future time based on the identified topographical features/parameters (e.g., those determined at (204)). More specifically, when the sprayer 10 travels up a steep hill, the ends 28, 30 of the boom assembly 24 may swing rearward, which may cause the boom assembly 24 to move back and forth in the fore/aft direction 40 relative to the frame 12. Similarly, when the sprayer 10 travels down a steep hill, the ends 28, 30 of the boom assembly 24 may swing forward, which may also cause the boom assembly 24 to move back and forth in the fore/aft direction 40 relative to the frame 12. As such, the computing system 110 may anticipate that the boom assembly 24 will move relative to the frame 12 at a future time when a hill or other slope is present within the field in front of the sprayer 10 at the current time.

Furthermore, in several embodiments, at (206), the computing system 110 may anticipate when the boom assembly 24 will move relative to the frame 12 in the fore/aft direction 40 at a future time based on the estimated acceleration of the sprayer 10 (e.g., the acceleration estimated at (204)). More specifically, when operator inputs a large and/or sudden acceleration command (e.g., by stepping on the accelerator with great force), the resulting acceleration of the sprayer 10 may cause the ends 28, 30 of the boom assembly 24 to swing rearward, which may cause the boom assembly 24 to move back and forth in the fore/aft direction 40 relative to the frame 12. Similarly, when operator inputs a large and/or sudden deceleration command (e.g., by stepping on the brake pedal with great force), the resulting deceleration of the sprayer 10 may cause the ends 28, 30 of the boom assembly 24 to swing rearward, which may cause the boom assembly 24 to move back and forth in the fore/aft direction 40 relative to the frame 12. As such, the computing system 110 may anticipate that the boom assembly 24 will move relative to the frame 12 at a future time when a large acceleration or deceleration command occurs (e.g., based on operator input) at the current time.

Additionally, or alternatively, at (206), the computing system 110 may anticipate when boom assembly movement will occur at a future time based on any other suitable operating parameters determined at the current time.

As shown in FIG. 3, at (208), the control logic 200 includes receiving second sensor data. In general, the second sensor data may be indicative of one or more operating parameters of the boom assembly 24 that are used in combination with the first operating parameter(s) to estimate the magnitude of the anticipated movement of the boom assembly 24 relative to the frame 12 in the fore/aft direction 40 will occur. That is, the second sensor data may be used to determine the magnitude of the boom assembly movement, but not when such movement will occur. As such, in several embodiments, the second sensor data may be indicative of one or more second operating parameters indicative of movement of the boom assembly 24. For example, as mentioned above, in some embodiments, the computing system 110 may be communicatively coupled to the boom assembly movement sensor(s) 106 via the communicative link 112. In this respect, during operation of the sprayer 10, the computing system 110 may receive data from the boom assembly movement sensor(s) 106 that is indicative movement of the boom assembly 24, such as its pitch, roll, and/or yaw.

Moreover, at (210), the control logic 200 includes determining one or more second operating parameters based on the received second sensor data. As indicated above, the second operating parameter(s) may be associated with the boom assembly 24 and used in combination with the first operating parameter(s) to estimate the magnitude of the anticipated movement of the boom assembly 24 relative to the frame 12 in the fore/aft direction 40. Specifically, in several embodiments, the computing system 110 may determine or estimate one or more second operating parameters associated with movement of the boom assembly 24 based on the received second sensor data. In such embodiments, the second parameters(s) may include the pitch, roll, and/or yaw of the boom assembly 24, the angle of the boom assembly 24 (or portions thereof) relative to the frame 12, and/or the like. For example, the computing system 110 may include a look-up table(s), suitable mathematical formula, and/or algorithms stored within its memory device(s) 116 that correlates the received second sensor data to the second operating parameter(s).

In several embodiments, the computing system 110 may receive the second sensor data (e.g., at (208)) and determine the second operating parameter(s) (e.g., at (210)) only after it has been anticipated that the boom assembly movement will occur (e.g., at (206)). This configuration may reduce computing resources needed to execute the control logic 200. However, in other embodiments, the computing system 110 may receive the second sensor data (e.g., at (208)) and determine the second operating parameter(s) (e.g., at (210)) at the same time that the first sensor data is being received (e.g., at (202)) and the first operating parameter(s) is being determined (e.g., at (204)). Such a configuration may be advantageous when the second operating parameter(s) is being used to control other aspects of the spraying operation.

Furthermore, at (212), when it is anticipated that the boom assembly will move at a future time, the control logic 200 includes estimating the magnitude of the anticipated movement of the boom assembly relative to the sprayer frame. More specifically, the magnitude of the anticipated movement of the boom assembly 24 may vary based on the first operating parameter(s). For example, a greater inclination of a hill/slope may result in a greater magnitude of boom assembly movement than a lesser inclination of a hill/slope. Similarly, a greater acceleration/deceleration of the sprayer 10 may result in a greater magnitude of boom assembly movement than a lesser acceleration/deceleration of the sprayer 10. As such, in several embodiments, the computing system 110 may be configured to estimate the magnitude of the anticipated movement of the boom assembly 24 relative to the frame 12 at the future time based on the determined first operating parameter(s) (e.g., the operating parameter(s) determined at (204)). As will be described below, the computing system 110 may use the estimated magnitude of the anticipated movement of the boom assembly 24 to control the boom assembly actuator(s) 108 before the future time to reduce or eliminate the anticipated boom assembly movement at the future time.

Additionally, at (212), the computing system 110 may use the determined second operating parameter(s) when estimating the magnitude of the anticipated movement of the boom assembly. More specifically, the second operating parameter(s) (e.g., the boom assembly movement parameter(s)) may not be suitable for anticipating when boom assembly movement will occur at a future time. However, second operating parameter(s) may affect the magnitude of any anticipated boom assembly movement. For example, the current pitch, roll, and/or yaw of the boom assembly 24 may not allow for anticipation of when the boom assembly 24 in the future. However, such parameters may affect how much the boom assembly will move at the future time. That is, when the boom assembly 24 has a certain pitch, roll, and/or yaw, the boom assembly 24 may move more when the sprayer 10 traverses a slope or accelerates than when other pitch, roll, and/or yaw values are present. In this respect, in some embodiments, the computing system 110 may use both the determined first and operating parameter(s) (e.g., the operating parameter(s) determined at (204) and (210), respectively) to estimate the magnitude of the anticipated movement of the boom assembly (e.g., the movement anticipated at (206)). However, in alternative embodiments, the computing system 110 may use only the determined first operating parameter(s) to estimate the magnitude of the anticipated movement of the boom assembly 24.

Moreover, at (214), the control logic 200 includes comparing the estimated magnitude of the anticipated movement of the boom assembly to a threshold magnitude value. More specifically, when the anticipated movement of the boom assembly 24 is small, such movement may not affect the evenness of the spraying operation being performed by the sprayer 10. In such instances, adjustment of the boom assembly actuator(s) 108 may not provide any improvement to the quality of the spraying operation. As such, in several embodiments, the computing system 110 may compare the estimated magnitude of the anticipated movement of the boom assembly (e.g., the magnitude estimated at (212)) to a threshold magnitude value. When the estimated magnitude exceeds the threshold magnitude value, the anticipated movement of the boom assembly 24 may be large enough to affect the quality of the spraying operation. As will be described below, in such instances, the computing system 110 control the operation of the boom assembly actuator(s) 108 to reduce or eliminate the anticipated boom assembly movement (e.g., at (216)). Conversely, when the estimated magnitude falls below the threshold magnitude value, the anticipated movement of the boom assembly 24 may be too small to affect the quality of the spraying operation. In such instances, the computing system 110 may not make any adjustment to the operation of the boom assembly actuator(s) 108 and, instead, continue to receive the first sensor data (e.g., at (202)) and determine the first operating parameter(s) (e.g., at (204)).

In addition, at (216), the control logic 200 includes controlling the operation of the boom assembly actuator(s) before the future time such that movement of the boom assembly relative to the frame is reduced at the future time. Specifically, in several embodiments, when it is anticipated that movement will occur and the estimated magnitude of such movement exceeds the threshold magnitude value, the computing system 110 may control the operation of the boom assembly actuator(s) 108 before the future time to reduce or eliminate the anticipated movement at the future time. Such control of the boom assembly actuator(s) 108 may be based on the estimated magnitude of the anticipated boom assembly movement (e.g., the magnitude estimated at (212)). For example, in such embodiments, the computing system 110 may transmit control signals to the boom assembly actuator(s) 108 (e.g., to the valve(s) associated with the fluid-driven actuator(s)). The control signals may, in turn, instruct the boom assembly actuator(s) 108 adjust its operation in a manner that will reduce or eliminate the anticipated movement at the future time. By initiating such control of the boom assembly actuator(s) 108 before the future time (i.e., before it is anticipated that boom assembly movement will occur), there may be sufficient time for the actuator(s) 108 to make the desired adjustment(s) before the future time to counteract the anticipated movement.

At (216), the computing system 110 may be configured to control the boom assembly actuator(s) 108 before the future time in any suitable manner that reduces or eliminates the anticipated movement of the boom assembly 24 at the future time. In some embodiments, the computing system 110 may control the operation of the boom assembly actuator(s) 108 to adjust the position of the boom assembly 24 relative to the frame 12, the position of a portion of the boom assembly 24 relative to another portion of the boom assembly 24, and/or the like. Additionally, in embodiments in which the boom assembly actuator(s) 108 is configured as a fluid-driven actuator(s), the computing system 110 may control the operation of the fluid-driven cylinder(s) such that the fluid pressure within the fluid-driven cylinder(s) is adjusted. Such position changes and/or fluid pressure changes may be determined based on the estimated magnitude of the anticipated boom assembly movement. For example, when it is anticipated that the boom assembly 24 will swing forward in the fore/aft direction 40 (e.g., due a downhill slope or deceleration), the computing system 110 may control the boom assembly actuator(s) 108 such that the ends 28, 20 of the boom assembly 24 are moved rearward and/or the fluid pressure within the actuator(s) 108 is increased to reduce or eliminate such forward boom assembly movement. Similarly, when it is anticipated that the boom assembly 24 will swing rearward in the fore/aft direction 40 (e.g., due an uphill slope or acceleration), the computing system 110 may be configured to control the boom assembly actuator(s) 108 such that the ends 28, 20 of the boom assembly 24 are moved forward and/or the fluid pressure within the actuator(s) 108 is increased to reduce or eliminate such rearward boom assembly movement.

In addition, when it is anticipated that the boom assembly will move, the computing system 110 may be configured to control any other suitable actuators or other components of the sprayer 10. For example, in one embodiment, the computing system 110 may be configured to control the operation of the nozzles 38 at the future time (i.e., when it is anticipated that the boom assembly will move) to further improve spray quality.

Figure 4:
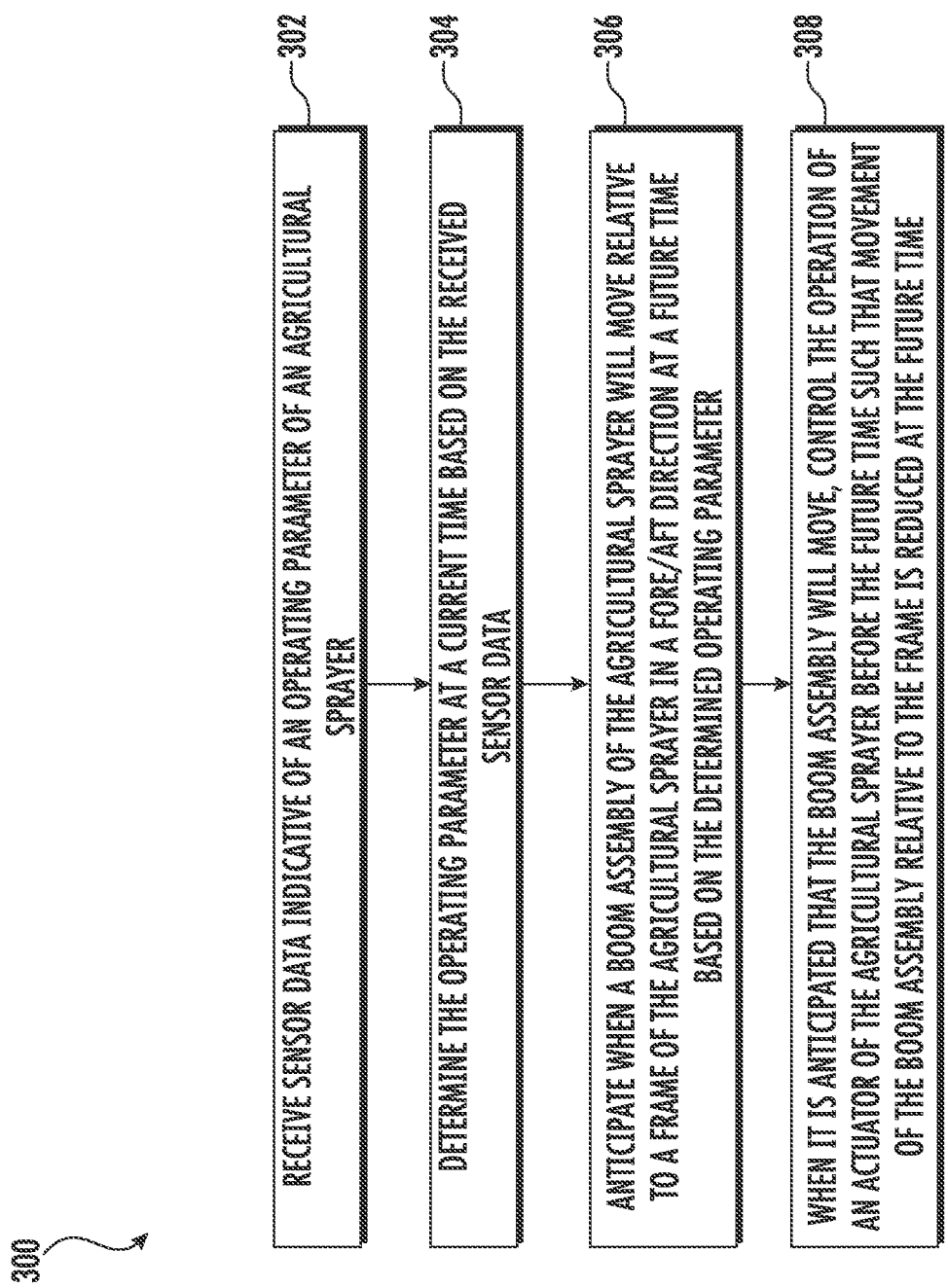
FIG. 4 illustrates a flow diagram of one embodiment of a method for controlling boom assembly movement of an agricultural sprayer in accordance with aspects of the present subject matter.

Referring now to FIG. 4, a flow diagram of one embodiment of a method 300 for controlling boom assembly movement of an agricultural sprayer is illustrated in accordance with aspects of the present subject matter. In general, the method 300 will be described herein with reference to the agricultural sprayer 10 and the system 100 described above with reference to FIGS. 1-3. However, it should be appreciated by those of ordinary skill in the art that the disclosed method 300 may generally be implemented with any agricultural sprayer having any suitable sprayer configuration and/or within any system having any suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (302), the method 300 may include receiving, with a computing system, sensor data indicative of an operating parameter of the agricultural sprayer. For instance, as described above, the computing system 110 may receive first sensor data indicative of one or more first operating parameters of the agricultural sprayer 10 from the location sensor 102 and/or the sprayer acceleration sensor 104 via the communicative link 112.

Furthermore, at (304), the method 300 may determining, with the computing system, the operating parameter at a current time based on the received sensor data. For instance, as described above, the computing system 110 may determine the first operating parameter(s) at the current time based on the received first sensor data.

Additionally, as shown in FIG. 4, at (306), the method 300 may include anticipating, with the computing system, when a boom assembly of the agricultural sprayer will move relative to a frame of the agricultural sprayer in a fore/aft direction at a future time based on the determined operating parameter. For instance, as described above, the computing system 110 may anticipate when the boom assembly 24 of the agricultural sprayer 10 will move relative to the frame 12 of the sprayer 10 in a fore/aft direction 40 at a future time based on the determined first operating parameter(s).

Moreover, when it is anticipated that the boom assembly will move, the method 300 may include, at (308), controlling, with the computing system, an operation of an actuator of the agricultural sprayer before the future time such that movement of the boom assembly relative to the frame is reduced at the future time. For instance, as described above, when it is anticipated that the boom assembly will move, the computing system 110 may control the operation of the boom assembly actuator(s) 108 of the agricultural sprayer 10 before the future time such that movement of the boom assembly 24 relative to the frame 12 is reduced or eliminated at the future time.

It is to be understood that the steps of the control logic 200 and the method 300 are performed by the computing system 110 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 110 described herein, such as the control logic 200 and the method 300, is implemented in software code or instructions which are tangibly stored on a tangible computer readable medium. The computing system 110 loads the software code or instructions via a direct interface with the computer readable medium or via a wired and/or wireless network. Upon loading and executing such software code or instructions by the computing system 110, the computing system 110 may perform any of the functionality of the computing system 110 described herein, including any steps of the control logic 200 and the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. An agricultural sprayer, comprising:
 a frame;
 a tank supported on the frame, the tank configured to store an agricultural fluid;
 a boom assembly coupled to the frame;
 a plurality of nozzles supported on the boom assembly, the plurality of nozzles configured to dispense the agricultural fluid stored within the tank onto an underlying field;
 an actuator configured to adjust a position of the boom assembly relative to the frame;
 a sensor configured to capture data indicative of an operating parameter of the agricultural sprayer; and
 a computing system communicatively coupled to the sensor, the computing system configured to:
  determine the operating parameter at a current time based on the data captured by the sensor;
  anticipate when the boom assembly will move relative to the frame in a fore/aft direction at a future time based on the determined operating parameter, the fore/aft direction being parallel to a direction of travel of the agricultural sprayer; and when it is anticipated that the boom assembly will move:
estimate a magnitude of the anticipated movement of the boom assembly, in the fore/aft direction relative to the sprayer frame based on the determined operating parameter; and
control an operation of the actuator before the future time based on the estimated magnitude such that movement of the boom assembly in the fore/aft direction relative to the frame is reduced at the future time.

2. The agricultural sprayer of claim 1, wherein the operating parameter is associated with an acceleration of the agricultural sprayer relative to the underlying field.

3. The agricultural sprayer of claim 1, wherein the operating parameter is associated with a topography of the field in front of the agricultural sprayer relative to the direction of travel.

4. The agricultural sprayer of claim 1, wherein, when it is anticipated that the boom assembly will move, the computing system is further configured to control an operation of the plurality of nozzles at the future time.

5. A system for controlling boom assembly movement of an agricultural sprayer, the system comprising:
a sprayer frame;
a boom assembly coupled to the sprayer frame;
an actuator configured to adjust a position of the boom assembly relative to the sprayer frame;
a sensor configured to capture data indicative of an operating parameter of the agricultural sprayer; and
a computing system communicatively coupled to the sensor, the computing system configured to:
determine the operating parameter at a current time based on the data captured by the sensor;
anticipate when the boom assembly will move relative to the sprayer frame in a fore/aft direction at a future time based on the determined operating parameter, the fore/aft direction being parallel to a direction of travel of the agricultural sprayer; and
when it is anticipated that the boom assembly will move:
estimate a magnitude of the anticipated movement of the boom assembly in the fore/aft direction relative to the sprayer frame based on the determined operating parameter; and
control an operation of the actuator before the future time based on the estimated magnitude such that movement of the boom assembly in the fore/aft direction relative to the sprayer frame is reduced at the future time.

6. The system of claim 5, wherein the operating parameter is associated with an acceleration of the agricultural sprayer relative to the underlying field.

7. The system of claim 5, wherein the operating parameter is associated with a topography of the field in front of the agricultural sprayer relative to the direction of travel.

8. The system of claim 5, wherein the sensor corresponds to a first sensor and the operating parameter corresponds to a first operating parameter, the system further comprising:
a second sensor configured to capture data indicative of a second operating parameter associated with the boom assembly, the second sensor communicatively coupled to the computing system, the computing system further configured to:
determine the second operating parameter at the current time based on the data captured by the second sensor; and
when it is anticipated that the boom assembly will move, estimate the magnitude of the anticipated movement of the boom assembly in the fore/aft direction relative to the sprayer frame based on both the determined first and second operating parameters.

9. The system of claim 8, wherein the second operating parameter comprises at least one of a pitch of the boom assembly, a roll of the boom assembly, or a yaw of the boom assembly.

10. The system of claim 5, wherein, when controlling the operation of the actuator, the computing system is further configured to:
compare the estimated magnitude of the anticipated movement of the boom assembly to a threshold magnitude value; and
when the estimated magnitude exceeds the threshold magnitude value, control the operation of the actuator before the future time based on the estimated magnitude such that the movement of the boom assembly in the fore/aft direction relative to the sprayer frame is reduced at the future time.

11. The system of claim 5, wherein, when controlling the operation of the actuator, the computing system is further configured to control the operation of the actuator such that the position of the boom assembly is adjusted relative to the sprayer frame before the future time to reduce the movement of the boom assembly.

12. The system of claim 5, wherein:
the actuator comprises a fluid-driven cylinder; and
when controlling the operation of the actuator, the computing system is further configured to control the operation of the fluid-driven cylinder such that a fluid pressure within the fluid-driven cylinder is adjusted before the future time to reduce the movement of the boom assembly.

13. A method for controlling boom assembly movement of an agricultural sprayer, the agricultural sprayer including a frame, a boom assembly coupled to the frame, and an actuator configured to adjust a position of the boom assembly relative to the frame, the method comprising:
receiving, with a computing system, sensor data indicative of an operating parameter of the agricultural sprayer;
determining, with the computing system, the operating parameter at a current time based on the received sensor data;
anticipating, with the computing system, when the boom assembly will move relative to the frame in a fore/aft direction at a future time based on the determined operating parameter, the fore/aft direction being parallel to a direction of travel of the agricultural sprayer;
when it is anticipated that the boom assembly will move, estimating, with the computing system, a magnitude of the anticipated movement of the boom assembly in the fore/aft direction relative to the sprayer frame based on the determined operating parameter; and
when it is anticipated that the boom assembly will move, controlling, with the computing system, an operation of the actuator before the future time such that movement of the boom assembly in the fore/aft direction relative to the frame is reduced at the future time.

14. The method of claim 13, wherein the operating parameter is associated with an acceleration of the agricultural sprayer relative to the underlying field.

15. The method of claim 13, wherein the operating parameter is associated with a topography of the field in front of the agricultural sprayer relative to the direction of travel.

16. The method of claim 13, wherein the sensor data corresponds to first sensor data and the operating parameter corresponds to a first operating parameter, the method further comprising:
receiving, with the computing system, second sensor data indicative of a second operating parameter associated with the boom assembly;
determining, with the computing system, the second operating parameter at the current time based on the received second sensor data; and
when it is anticipated that the boom assembly will move, estimating, with the computing system, the magnitude of the anticipated movement of the boom assembly in the fore/aft direction relative to the frame based on both the determined first and second operating parameters.

17. The method of claim 16, wherein the second operating parameter comprises at least one of a pitch of the boom assembly, a roll of the boom assembly, or a yaw of the boom assembly.

18. The method of claim 13, wherein the controlling operation of the actuator comprises:
comparing, with the computing system, the estimated magnitude of the anticipated movement of the boom assembly to a threshold magnitude value; and
when the estimated magnitude exceeds the threshold magnitude value, controlling, with the computing system, the operation of the actuator before the future time such that the movement of the boom assembly in the fore/aft direction relative to the frame is reduced at the future time.

* * * * *